United States Patent [19]

Talbott, Jr.

[11] 4,181,028
[45] Jan. 1, 1980

[54] MULTI-AXIS, COMPLEX MODE PNEUMATICALLY ACTUATED PLATE/SPACE FRAME SHAKER FOR QUASI-RANDOM PNEUMATIC VIBRATION FACILITY

[75] Inventor: Charles F. Talbott, Jr., Chatsworth, Calif.

[73] Assignee: Hughes Aircraft Company, Culver City, Calif.

[21] Appl. No.: 897,823

[22] Filed: Apr. 19, 1978

[51] Int. Cl.² .......................................... G01N 29/00
[52] U.S. Cl. .................................................... 73/665
[58] Field of Search ................. 73/665, 663, 664, 666, 73/667, 668

[56] References Cited

U.S. PATENT DOCUMENTS

| | | | |
|---|---|---|---|
| 2,890,584 | 6/1959 | Dickie | 73/665 |
| 3,710,082 | 1/1973 | Sloane et al. | 73/664 X |
| 4,011,749 | 3/1977 | Cappel | 73/665 |

Primary Examiner—Jerry W. Myracle
Attorney, Agent, or Firm—Lewis B. Sternfels; W. H. MacAllister

[57] ABSTRACT

Pneumatically driven vibrators coupled to resonating, self-attenuating structures define a shaker which, when included in a vibration system, enables a test item to be vibration tested under controlled conditions of multi-frequency, multi-degree-of-freedom acceleration history, to achieve a frequency spectrum and acceleration-level control of a broadband quasi-random vibration output in the frequency range, for example, from 40 Hz to 2 kHz for vibration testing of equipment. The driving set of structure responds to an intense vibration spectrum, created by the attached pneumatic vibrators, with multi-modal forced and resonant frequencies in limited directions. The driven set of structure, holding the test hardware, responds with forced and harmonic oscillations to a vibration field transmitted from the driving set of structure through a specially designed elastomeric path. Specific design of the size, mass, and resonant behavior of the driving and driven structure sets with appropriate transmissibility characteristics of the elastomeric interface results in a controlled multi-modal, uniform RMS acceleration, multi-degree-of-freedom, wide frequency-range vibration testing method.

13 Claims, 13 Drawing Figures

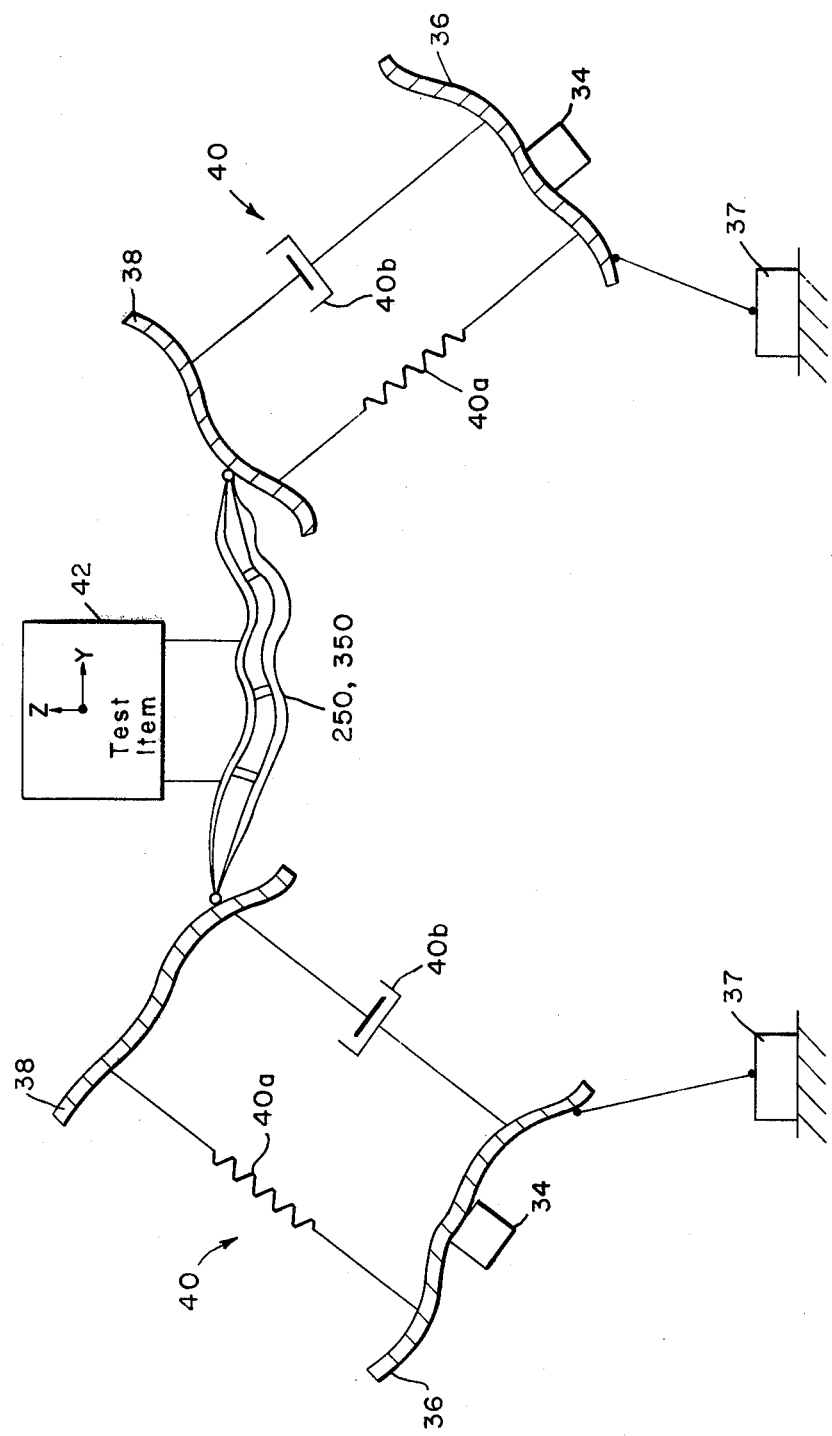

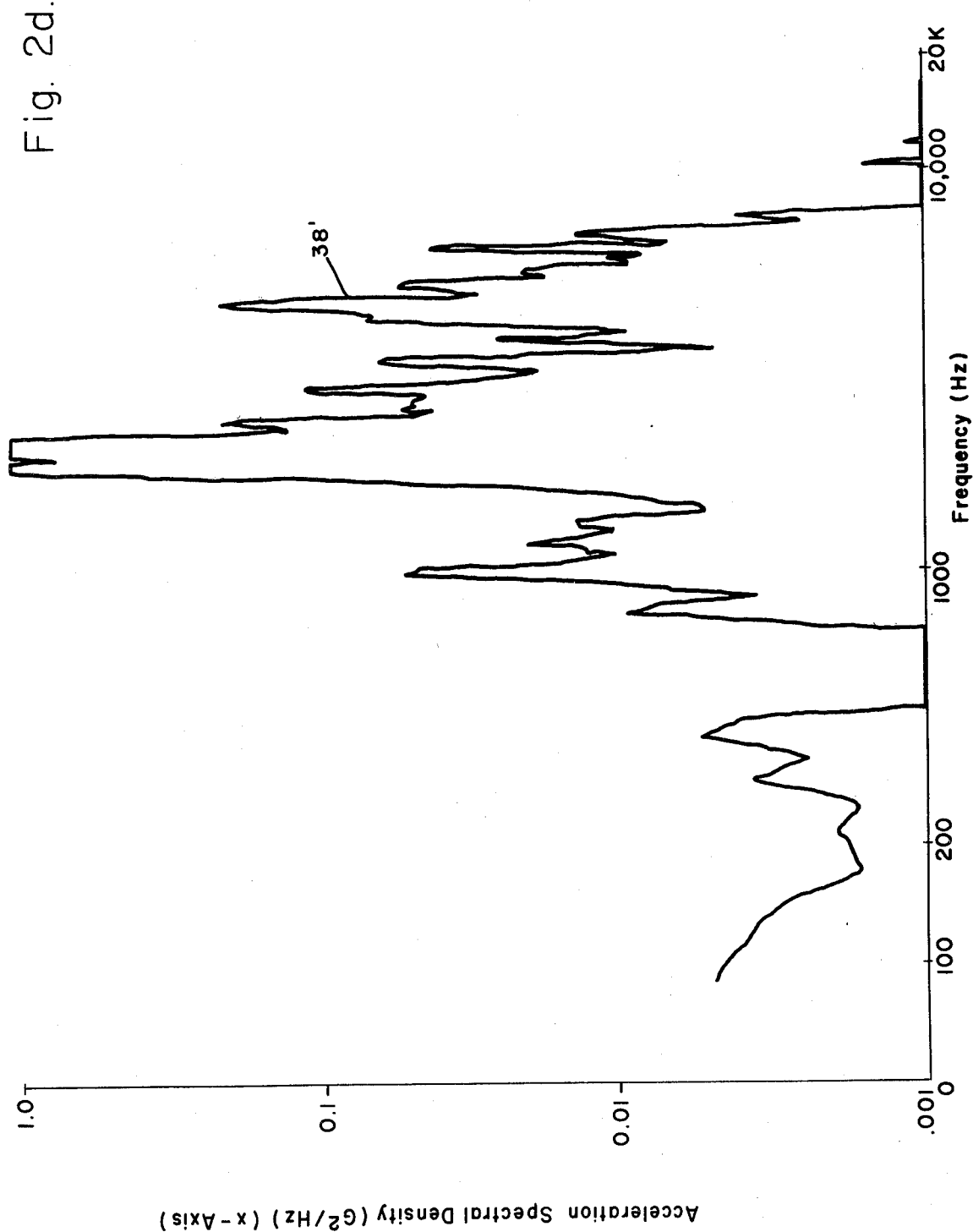

MULTI-AXIS, COMPLEX MODE PNEUMATICALLY ACTUATED PLATE/SPACE FRAME SHAKER FOR QUASI-RANDOM PNEUMATIC VIBRATION FACILITY

BACKGROUND OF THE INVENTION

The invention herein described was made in the course of or under a contract or subcontract thereunder, with the Department of the Navy.

1. Field of the Invention

The present invention relates to multi-degree-of-freedom vibration test equipment and, in particular, such equipment employing pneumatic vibrators and incorporating automatic frequency modulation and acceleration level control, e.g., for proof of workmanship, for operational screening, and for engineering development tests and, in particular, a vibration shaker actuated by pneumatic vibrators.

As used herein, the terms "quasi-random" and "pseudo-random" are defined as follows. "Quasi-random" vibration can be described as a line spectrum with equally spaced lines, e.g., harmonics, whose fundamental frequency varies randomly with time within a restricted frequency range (e.g., accelerations) at the spectral lines. The fundamental frequency fluctuates sufficiently to produce an essentially continuous spectrum when averaged over a long enough time interval. By "pseudo-random", it is meant that there is a mathematical method or algorithm for selecting a sequence of numbers, e.g., for use in modulating the driving means for the vibrators. "Pseudo" means that the randomness is not purely random because the sequence results from predetermined calculations.

Also as used herein, the terms "multi-degree-of-freedom", "spectrum" and "multi-modal" are defined as follows. "Multi-degree-of-freedom" is used to define the ability of structure to translate and rotate in several directions simultaneously within given bounds. "Spectrum", e.g., as in "intense vibration spectrum", means the cumulative time history of the vibrations (e.g., in $G^2/Hz$) as related to the frequency associated with a particular level of vibration. "Multi-modal" means the simultaneous occurrence of many structural vibrational modes, or dynamic displacements.

As further used herein, a "node" is defined as a point on a vibrating structure where vibrational displacements are zero or nearly zero in at least one direction. An "anti-node" is a point where maximum vibrational displacement occur in one or more directions.

2. Description of the Prior Art and Background Considerations

Prior art vibration screening of equipment, e.g., airborne radar units, infrared sensors and missiles, was accomplished by single-axis mechanical vibration apparatus working with fundamental frequency of excitation and uncontrolled harmonics. Alternatively, electrodynamic shakers and control systems were employed for single-axis or, in groups, multi-axis testing. Such systems are very expensive, and multi-axis configurations present problems as to the coherence of acceleration inputs.

The use of multiple pneumatic vibrators for the simulation of random vibration was first suggested by General Dynamics Corporation in a paper in *Shock & Vibration Bulletin*, No. 46, Part 3, August 1976, pp. 1-14. This paper describes a missile test in which nine pneumatic vibrators are attached directly to a freely suspended missile. An approximation of measured in-flight random vibration was obtained. Frequency spectrum and acceleration level were determined by the number and size of the attached vibrators and the mean air pressure. The supply pressure was modulated in a periodic form to prevent locking on the first bending mode of the missile structure and to fill in the frequency spectrum. In a panel discussion reported in the *Journal of Environmental Sciences*, November/December 1976, pp. 32–38, Westinghouse Electric Corporation discloses development of a pneumatic vibrator system for testing avionics equipment. Pneumatic vibrators are said to be attached directly to rigid vibration fixtures to achieve a two-axis excitation. Air pressure is modulated to minimize the line spectrum. Major emphasis is aimed at achieving significant vibration energy content at frequencies below 500 Hz.

Other prior work in relevant technology is disclosed in U.S. Pat. Nos. 4,011,749; 3,686,927 and 3,710,082.

U.S. Pat. No. 4,011,749 describes a multi-degree-of-freedom shaker whose rigid test table is given time-variant displacements by a complex hydraulic actuation system with six degrees of freedom. The shaker is controllable at the expense of great complexity and mass.

U.S. Pat. No. 3,686,927 discloses a method for coupling selected plates, beams, or concentric cylinders with other beams or resonating intermediate structure to effect multi-modal vibration fields for test articles. The system described is controlled by excitation frequency and amplitude only.

U.S. Pat. No. 3,710,082 describes a method of controlling vibrations to a pre-determined frequency content by digitally sensing the vibration response (analog plus analog to digital converter), determining the frequency domain (Fourier transform), comparing it with a pre-determined spectrum, combining it with (by multiplying it by) a random number (sine and cosine of four angles), transforming to a time domain (inverse Fourier transform), converting to analog and subsequently exciting an electronically driven shaker table.

SUMMARY OF THE INVENTION

Pneumatically driven vibrators coupled to resonating, compliant, simply excited self-attenuating structures define a shaker which enables a test item to be vibration tested under controlled conditions of multi-frequency, multi-degree-of-freedom acceleration history, to achieve frequency spectrum and acceleration-level control of a broadband quasi-random vibration output in the frequency range, for example, from 40 Hz to 2 kHz for vibration testing of equipment.

The driving set of structure responds to an intense vibration spectrum, created by the attached pneumatic vibrators, with multi-modal forced and resonant frequencies in multiple directions. The driven set of structure, holding the test hardware, responds with forced and harmonic oscillations to a modulated vibration field transmitted from the driving structure set through a specially designed elastomeric path. Specific design of the size, mass, and resonant behavior of the driving and driven structure sets with appropriate transmissibility characteristics of the elastomeric interface results in a heretofore unachieved controlled multi-modal, uniform RMS acceleration, multi-degree-of-freedom, wide-frequency-range vibration testing method. Change is pneumatic vibrator operating pressure changes vibrator frequencies and expand available modal density.

A first embodiment establishes and controls a vibration spectrum characterized in three degrees of freedom by relatively uniform RMS acceleration and includes symmetrical driving and driven metal plates with a compliant test hardware fixture of planar symmetry. A second embodiment is characterized in six-degrees-of-freedom test article excitation and includes equal size plates arranged in partial symmetry about an asymmetrical space frame. The space frame interfaces with test hardware fixtures.

Automatic control and pseudo-random modulation of air pressure of the pneumatic vibrators provide closed loop acceleration spectrum control and spectrum smearing in and about three orthogonal axes simultaneously to enhance frequency content and to prevent the shaker from locking onto any particular vibration frequency, especially a natural frequency of the test article, thus affording a realistic simulation of operational environments. The vibrators' vibration frequency is modulated by supplied air pressure. Means for modulating the air supply pressure automatically and quickly permits changes in the vibration frequencies of the vibrators. The vibrators are mechanically processed by the driving and driven sets of structure into the desired form of vibrational excitation to be exerted on the test item.

More specifically, the vibrators are coupled to a driving plate structure which is coupled to a driven plate structure by elastomeric materials. A space frame characterized by natural harmonic frequencies different from those of the driven plate is attached by several pivots to the driven plate and thus becomes part of the complex multi-modal driven structure. The test item is secured to the space frame on the driven plate structure. The physical properties of the elastomeric materials are used to direct, filter, and attenuate the amplitude and frequency of the time-space variant displacements from the driving structure interface to the driven structure interface. The non-linear transmissive properties of these elastomers are used to control the transmissibility over a frequency range below 2 kHz and also to inhibit vibration transmission above 2 kHz. This is possible because damping and stiffness properties change with certain frequencies and with changes in pressure on the elastomer surfaces.

The driving plate structures vibrate in multiple plate bending mode imparting basically one dimensional displacements at each coupling interface. These one dimensional displacements occur at many different rates and amplitudes along the length and breadth of the interface. In the present invention, there are two sets of non-parallel plate surfaces. Coupling the resultant, normally non-synchronous nonparallel displacements of the separate driven plate surfaces through attaching hinges on a flexible space frame creates a resultant planar, multi-degree-of-freedom (i.e., orthogonal translatory and multi-rotational) displacement-time history at the driven structure interface with the test hardware. A first embodiment, comprises a nominally three-degree-of-freedom (two translational and one rotational) shaker since the vibrational displacements of the space frame attachments occur in parallel planes at each end of the plate V-configuration. Structural cross-talk leads to accelerations normal to these planes. In a second embodiment, a skewed plate, asymmetric space frame structure enforces by design non-coplanar, non-parallel displacements with resulting six-degree-of-freedom (three translational and three rotational) motion.

The modal density of the driven structures vibration history is governed both by the vibrations introduced through the elastomer couplings from the driving structures and by the plate-bending and frame asymmetric bending and torsional component harmonic coupled frequencies of the driven plate/space frame structures. Mutually coupled vibration modes of driving-driven structures sets are subject to the effects of both the elastomer's geometric flat contact patterns between adjacent plates and the transmissibility characteristics of the elastomeric couplings. Further modulating of the excitation history to which test articles are exposed may be obtained by interposing a selected configuration of elastomer material between sets of driven structure, for example, to further modify frequency and displacement-directional history. The test article may be fixed to a number of attachments on the driven frame structure or it may be supported by an interfacing rigid fixture attached to the frame. By modulating the pneumatic vibrator output by pressure changes, a beneficial forced frequency smearing of the power spectrum can be effected. Alteration of the flat pattern shape, consistency and stiffnes/damping character of the elastomer offers a method for selective frequency/amplitude modulation and/or control.

In conjunction with a closed-loop, quasi-random pneumatic pressure control system, the present invention provides the modal density and RMS acceleration uniformity for multi-degrees-of-freedom with desired frequency roll-off above 2 kHz due to low-frequency design and due to elastomer damping behavior.

The control system controls vibration to a preselected value by periodically sensing the vibration coordinate axis acceleration response about the test item, computing the root-mean-square response, comparing it with a preselected root-mean-square acceleration value, and digitally adjusting the air supply to the pneumatic vibrators. In addition, the predetermined spectrum of the shaker system is controlled mechanically.

In the overall performance of the vibration scheme, the output of the pneumatic vibrators is altered through pressure modulation of the vibrators, to result in effective augmentation of the output and in vibration spectrum smearing. Pressure modulation is achieved by modulation of the area of an orifice located between the air supply and the pneumatic vibrator drive manifold. A microprocessor is programmed with a semi-empirical relationship between the orifice area and the test-item frequency response. During a test, the microprocessor periodically varies the orifice area by means of an air-pressure-modulation flow-control mechanism and drive circuitry using a pseudo-random number algorithm to produce a desired, e.g., uniform distribution of values of the drive-manifold pressure.

Pressure variations produce changes in acceleration response of the test item. Spectrum smearing and any problems resulting from acceleration variation are reconciled through an automatic control system. Automatic level control is based on periodic comparison of an estimate of the root-mean-square acceleration with the test-level setting. Acceleration feedback from the three orthogonal axes is fed through a low-pass filter (e.g. 2 kHz) and a sample-and-hold function to a multiplexer, and digitized by means of an analog-to-digital converter. The unfiltered signals also are fed through an auxiliary multiplexer to a peak detector, from which is derived a fast-action over-test detector function. The microprocessor subsystem performs the balance of the data aquisition. Each of the digital accelerometer signals is processed to create an estimate of the root-mean-square acceleration level. The drive pressure required for the specified test level is adjusted periodically during a test by automatic servo adjustment of a pressure regulator through appropriate drive circuitry.

It is, therefore, an object of the invention to provide a means for vibrating a test item in a controlled fashion.

Another object is to provide a method for screening, burn-in, quality control, etc., testing of electronic and other equipment, particular under operating conditions.

Another object is to provide for a test method operable under conditions of controlled frequency bandwidth, variable modal density, and multi-directional acceleration history with uniform RMS acceleration levels in specified directions.

Another object is to provide for two axis, or planar, vibration testing which controlled rotational acceleration about the third, orthogonal axis.

Another object is to provide for three dimensional testing with translational and rotational controlled RMS acceleration for three orthogonal axes.

Another object is to provide for simultaneous multi-axial broadband quasi-random vibration.

Another object is to provide for a vibration system which, in comparison with conventional the conventional systems, is of small cost.

Another object is to provide for such a vibration system which is readily adaptable to a wide range of product sizes and shapes.

Another object is to provide for a compact, self-contained system which requires only normal shop air and electrical power.

Another object is to provide for a simple and inexpensively maintainable system.

Other aims and objects as well as a more complete understanding of the present invention will appear from the following explanation of exemplary embodiments and the accompanying drawings thereof.

DESCRIPTION OF THE PREFERRED EMBODIMENTS

Figure 1:
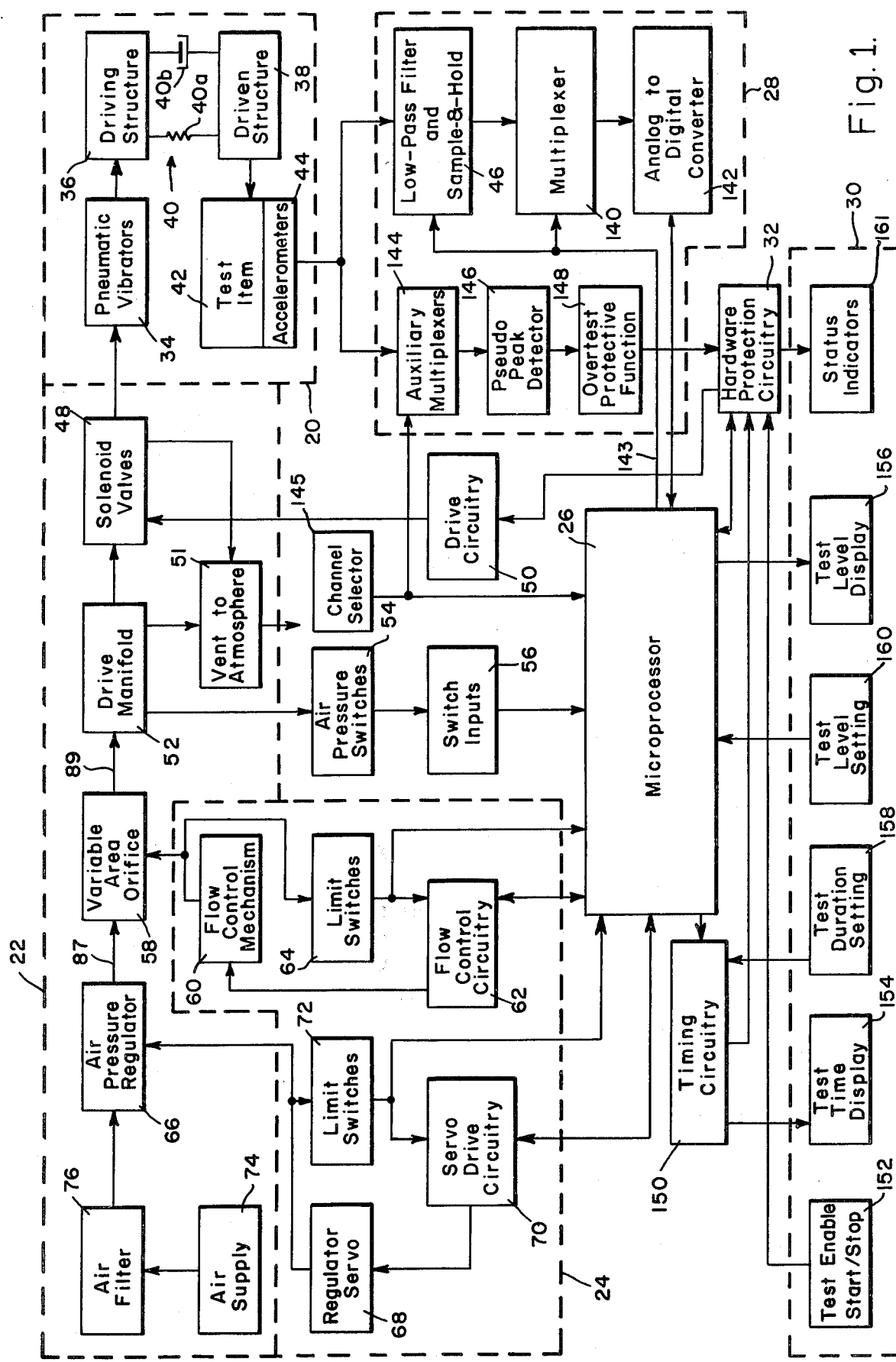
FIG. 1 illustrates the overall facility and modulating system therefor in block diagram.

Referring now to FIG. 1, a vibration system, which is more fully disclosed in copending patent application Ser. No. 897,821 filed herewith, entitled "Quasi-Random Pneumatic Vibration Facility and Automatic Frequency Modulating System," by Henry T. Abstein, Jr., Dennis B. Page, James M. Kallis, Charles F. Talbott, Jr. and Richard L. Baker, is illustrated as being subdivided into several major subsystems. These subsystems include a shaker table assembly 20, an air pressure and flow control mechanism 22 pneumatically coupled to shaker table assembly 20, air pressure and flow control drive circuitry 24 coupled to mechanism 22 for regulating the pressure level and quantity of air delivered therethrough, a microprocessor 26 coupled to air pressure and flow control mechanism 22 for insuring that the pressure level and quantity of air delivered to shaker table assembly 20 is sufficient for driving the same, a feedback and over-test protective subsystem 28 electrically coupled between shaker table assembly 20 and microprocessor 26 to insure that the micro-processor is provided with the necessary feedback information to properly function, operator interface subsystem 30 for enabling an operator to establish the proper test parameters as well as to be informed thereof, and hardware protection circuitry 32 interposed between microprocessor 26 and drive circuitry 50 for control of "ON-OFF" solenoid valves 48 in air pressure and flow control mechanism 22 to protect the system from excessive vibrational levels that might otherwise injure the device being tested. Air pressure switches 54 and switch inputs 56 couple a drive manifold 52 in mechanism 22 to microprocessor 26.

In initially describing the system operation, the output of shaker table assembly 20 with a test item thereon is fed back through subsystem 28 and compared with a preselected vibrational setting in microprocessor 26 to generate an error signal which, in turn, is applied through air pressure and flow control circuitry 24 to air pressure and flow control mechanism 22. Mechanism 22 then causes structure in shaker table assembly 20 to vibrate a specimen in a controlled manner, and the shaker's vibratory output is fed back as described above.

With reference also to FIG. 2 and as will be more fully described below with respect to FIGS. 3–7, shaker table assembly 20 includes a plurality of pneumatic vibrators collectively identified by indicium 34 which are coupled to a driving structure 36 to impart vibratory inputs thereto, as noted in FIG. 2. The entire assembly is supported at or near driven structure node points on isolators 37. The driving structure is caused to assume varying modes of vibration based upon forced harmonic response to the excitation inputs from the vibrations in conjunction and on natural multimodal response of the structure due to the specifically designed physical configuration and material properties, which are typically of aluminum and/or magnesium. The dynamic distortions, which result from the many modes of forced and natural vibration and which are greatly exaggerated as shown in FIG. 2, are modified and transmitted to a driven structure 38 by means of a visco-elastic construction 40 having, for example, resilient components 40a and damping components 40b. Driven structure 38, therefore, will assume complex modes of dynamic distortion composed of multimodal space-frame dynamics imposed on multimodal plate behavior, also which are shown in exaggeration in FIG. 2 and which are super-positions of forced and natural vibration modes of driven structure 38 and of the dominant modes imparted from driving structure 36. Maximizing coupled multimodal response between the driving and the driven structures is enhanced by situating the connecting pivots of the space frame at the most frequently repeatable anti-node (maximum displacement) stations of the structure sets.

Figure 2A:
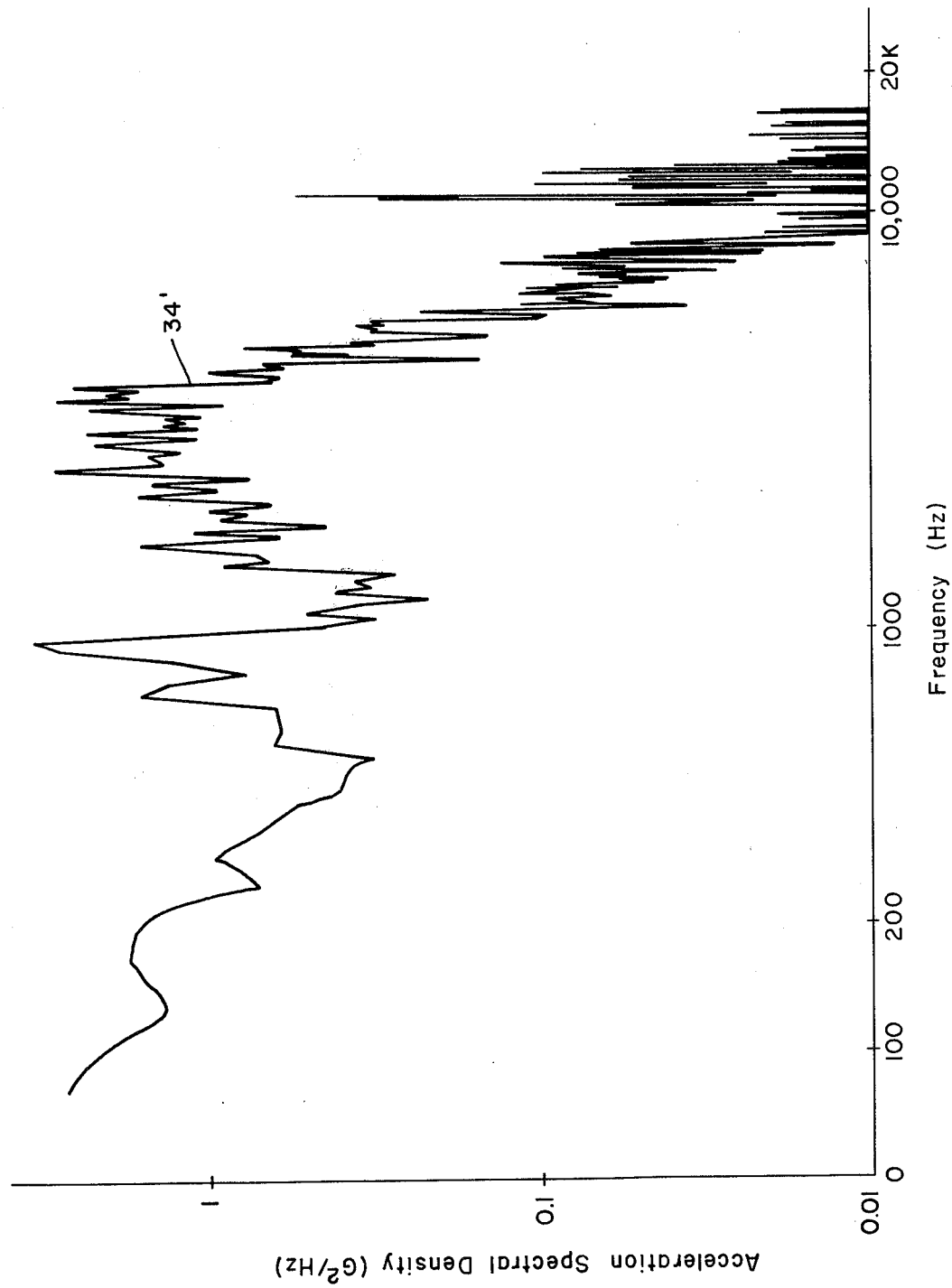
FIG. 2 schematically depicts the energy transform in the shaker table assembly of FIGS. 3–7 from the pneumatic vibrators, through the driving structure, the elastomeric coupling and the driven structure, to a test item, with representative frequency curves therefor shown in FIGS. 2a–2f.
Figure 2B:
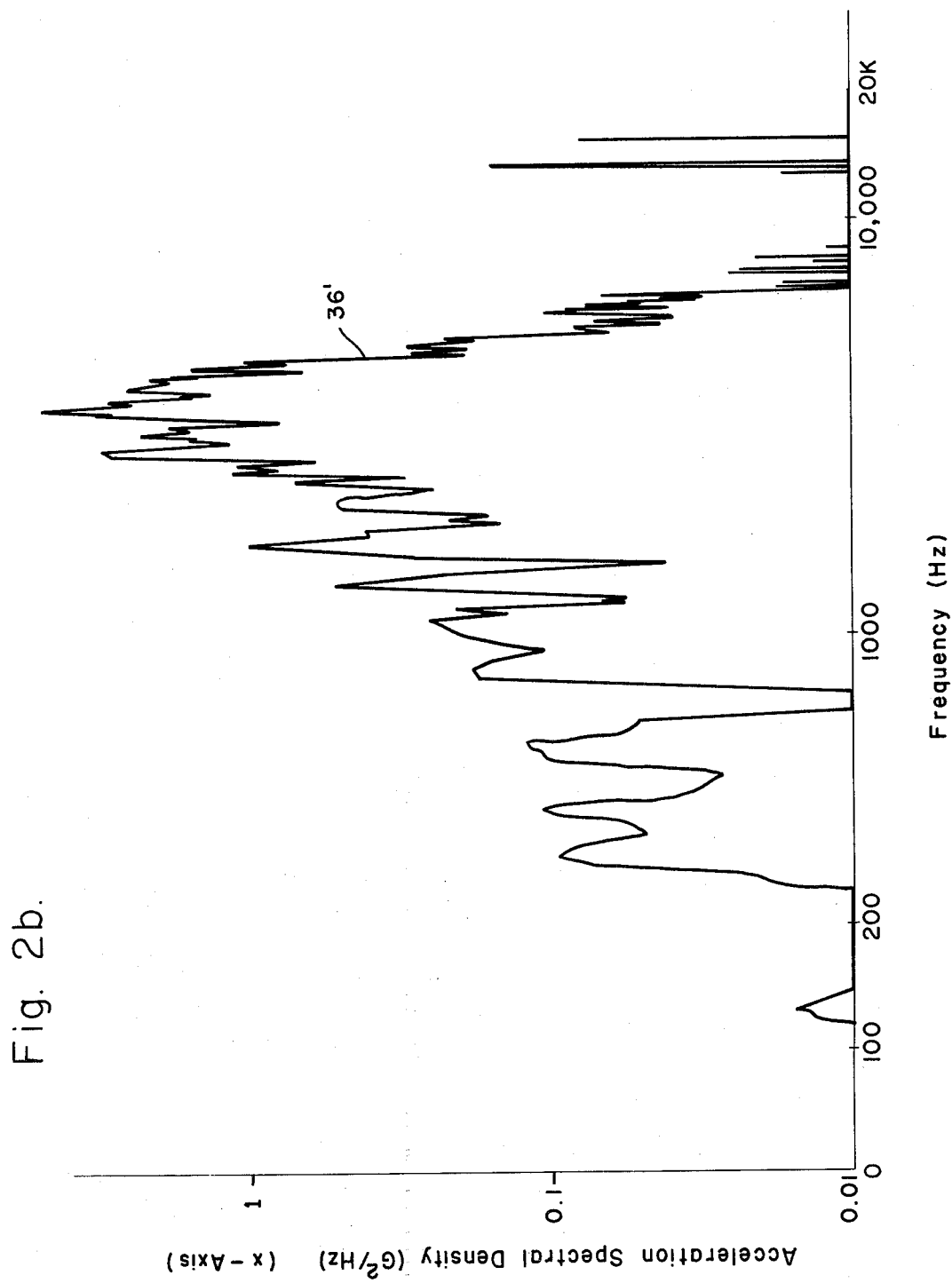
Figure 2C:
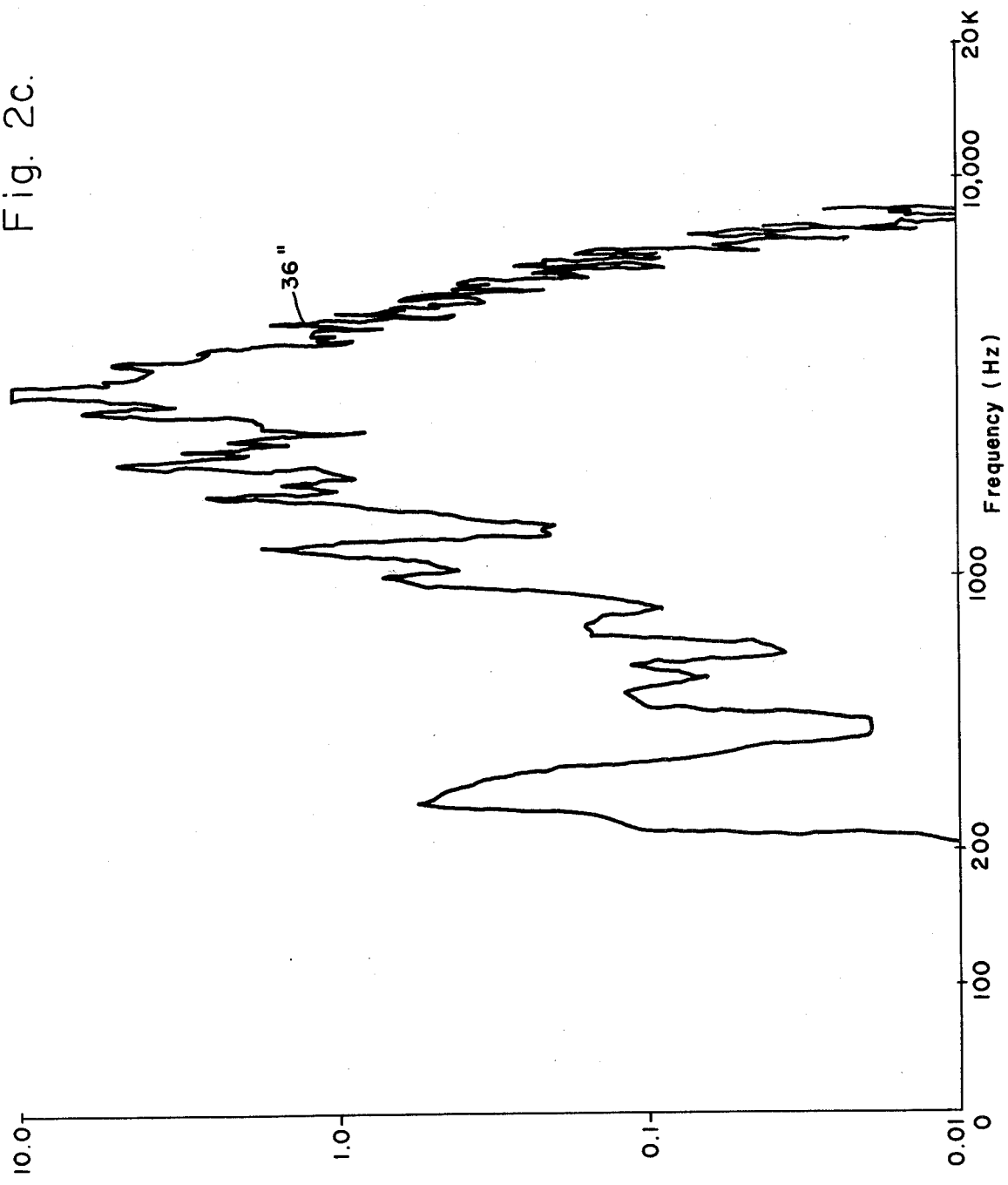
Figure 2E:
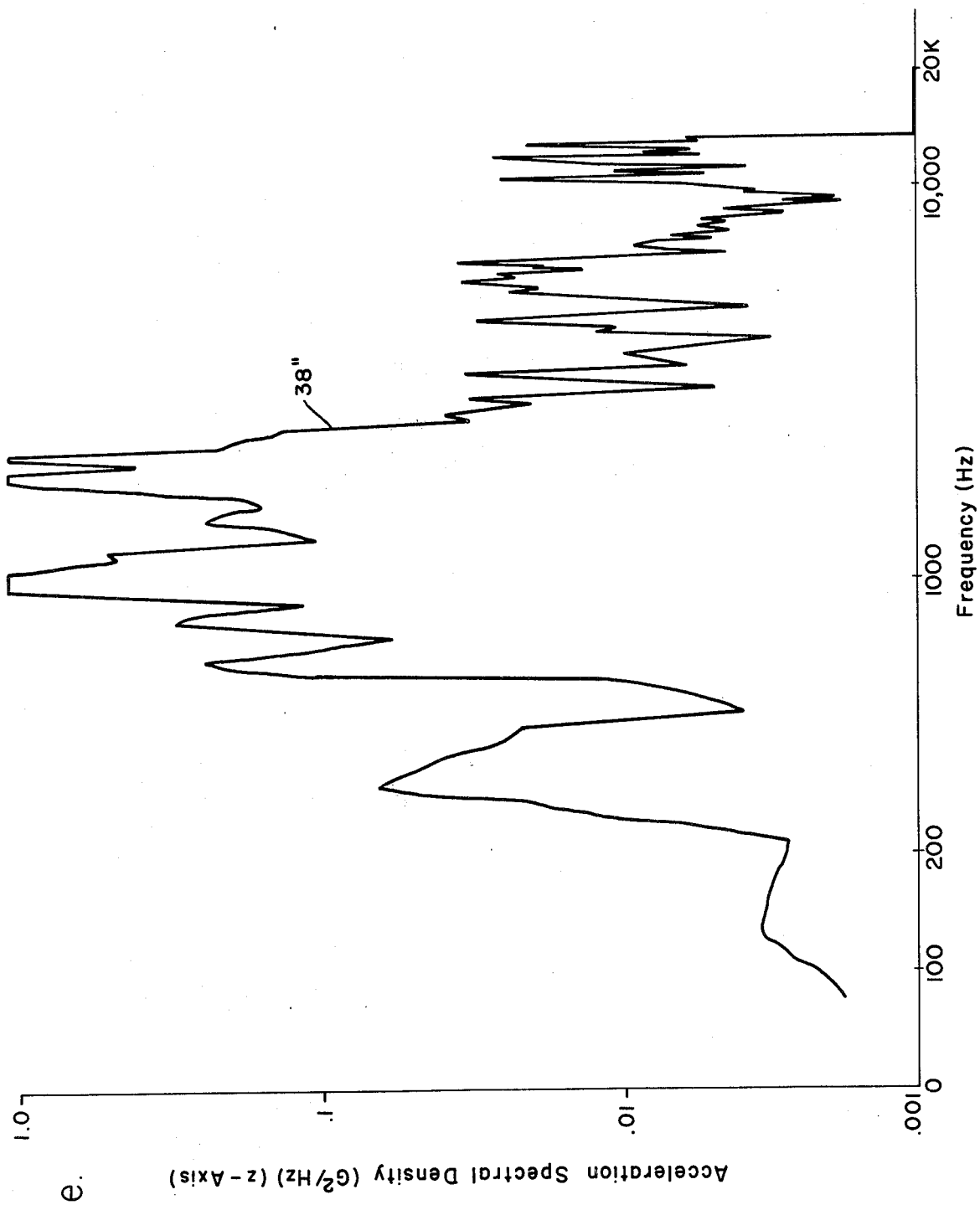
Figure 2F:
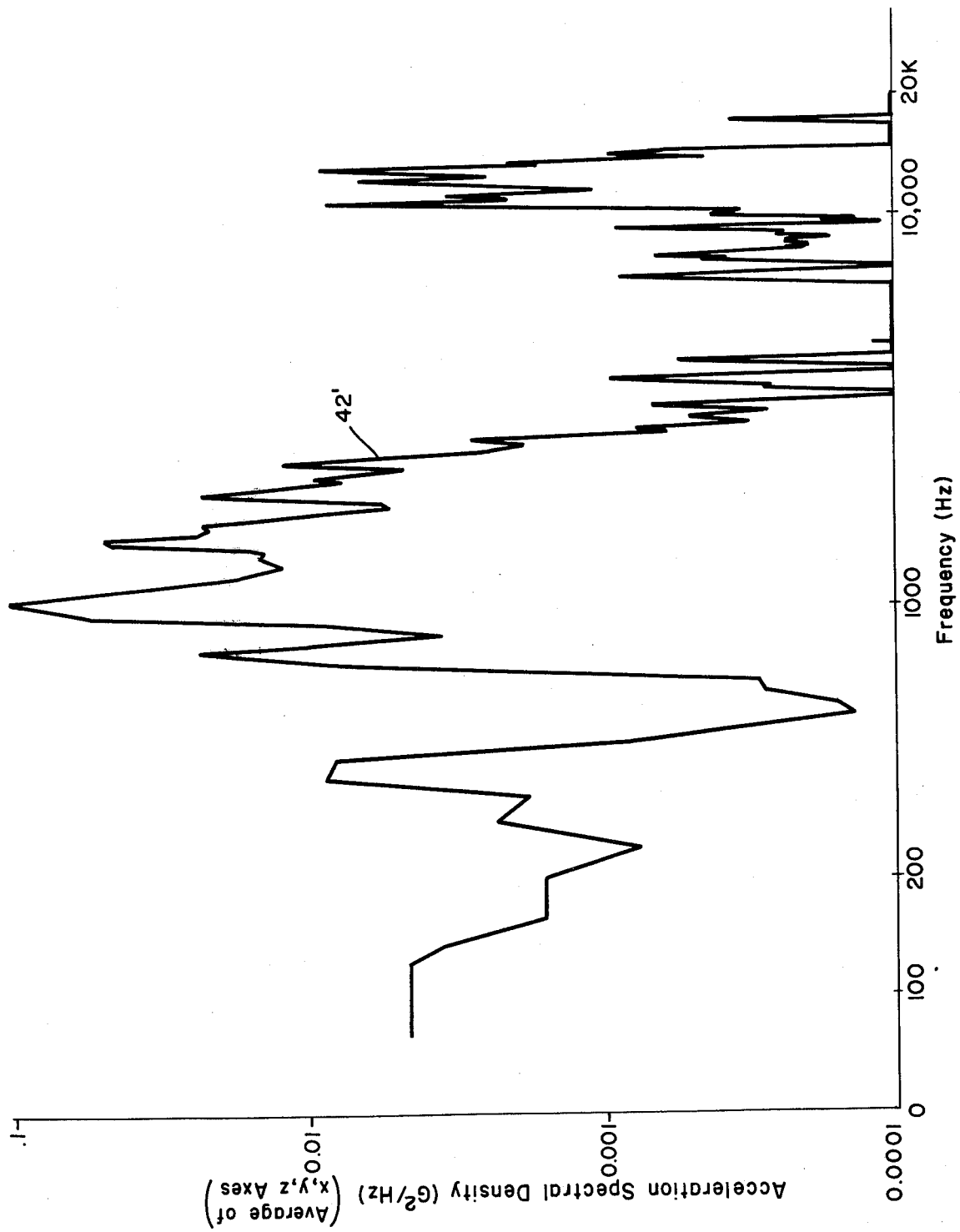

Accompanying the structure illustrated in FIG. 2 and depicted in FIGS. 2a–2f are representative curves depicting the relationship between acceleration spectral density, in $G^2/Hz$, and frequency, in Hz, with curve 34' measured normal to the piston axis of pneumatic vibrator 34 (FIG. 2a), with curves 36' and 36" showing the power spectral density graphs respectively in the "x" and "z" directions for driving structure 36 (FIGS. 2b and 2c), with curves 38' and 38" showing the power spectral density graphs respectively in the "x" and "z" directions for driven structure 38 (FIGS. 2d and 2e), and with curve 42' measured at test item 42 depicting the vibrations in three directions applied thereto (FIG. 2f). The vibrational output from driven structure 38 is sensed by accelerometers 44 which are fed into feedback and overtest protective subsystem 28.

The basis of the mechanical vibration device embodied in shaker table assembly 20 is that a structure can be excited in many translational and rotational vibration modes, dominated by multiples of both the excitation frequency and the natural frequencies of the structure. The frequencies of the first few natural modes of the structure embodied in driving structure 36 are by design not integer multiples of the primary excitation frequency obtained from pneumatic vibrators 34 to insure a power equality in forced and natural spectra. The complex modal coupling between initially excited structure 36 and driven structure 38 results in a rich composite of vibratory modal history arising from individual and unified structures behavior as modified by viscoelastic coupling 40. Test item 42 is subjected to the resulting vibration spectrum. The means by which driving structure 36 and driven structure 38 are coupled makes it possible to obtain a controllable power spectrum, with specific acceleration level limits from 40 Hz to 2 kHz, which are limits of vibration frequency for typical military specifications. As further described in copending application Ser. No. 897,822 filed herewith, entitled "Nodal/Modal Control and Power Intensification Methods and Apparatus for Vibration Testing" by Charles F. Talbott, Jr., the elastomeric materials of construction 40 have specifically tailored shapes and properties and are inserted with associated mechanisms between the driving and driven structures for control and power intensification purposes. The visco-elastic transmissibility and filtering characteristics of the chosen elastomers allow a roll-off of the vibration acceleration spectrum input to the test article at or near the upper frequency limit, regardless of the high frequencies excited in driving structure 36.

Vibrators 34 preferably comprise impacting free-piston pneumatic vibrators rather than air-cushioned free-piston pneumatic vibrators, rotary pneumatic vibrators or otherwise operated vibrators, such as by hydraulic and electro-mechanical means, but those can be used if the desired types of dominant vibrational frequencies are obtainable therefrom. Impact vibrators are preferred so that the sliding piston therein impacts on at least one of the vibrator housing end surfaces after the drive gas pressure reaches some threshold. This impact gives rise to a repeatable chain of mechanical vibratory transients that are rich in harmonic content having a very broad spectral characteristic, typically covering a range from about 50 Hz to several thousand Hertz, the upper limit depending largely on the resonant characteristic of the structure on which the vibrator is mounted. It is preferred also to use different sizes and combinations of vibrators characterized by different rigid body fundamental frequencies for a given gas pressure in conjunction with the structural frequency response of the shaker components and the mass thereon. The gas pressure determines the fundamental or lowest repetition rate and the resulting impact force level.

Uniform vibrational energy coupling between the shaker elements is desirable a every frequency between the lowest attainable frequency and approximately 2 kHz. However, much of the input energy is concentrated around multiples of the fundamental rigid body frequency of the free piston vibrators. This condition dictates a requirement for modulation of the drive pressure sufficient to cause an excursion of the fundamental pulse repetition frequency of 25% to 50% about the nominal. Such excursion causes a "smearing" of the frequency spectrum and assures that there is sufficient vibrational energy present for a predictable percentage of the test time at every frequency without causing a "lock-on" at any given frequency.

While the following description of the system illustrated in FIG. 1 in the next several paragraphs ending with reference to FIGS. 3–7 is set forth in detail, it is not intended that such detail be or comprise the main inventive embodiment of this disclosure. Such detail is included solely for completeness of the disclosure, especially with regard to the best mode for optimizing operation of the quasi-random shaker.

As stated above, pneumatic vibrators 34 are actuated by air pressure and flow control mechanism 22. Specifically, a vibrator or group of vibrators is connected to solenoid operated air valves 48. Each air valve 48 is maintained in an open position during operation of the system, and each is coupled to a drive manifold 52 for uniform supply of air equally to all solenoid valves. Solenoid valves are electrically operated by appropriate drive circuitry 50 which is coupled to microprocessor 26 through hardware protection circuitry 32. In the event that an overtest or other damaging conditions arise, hardware protection circuitry 32 opens the circuit between microprocessor 26 and drive circuitry 50 to close solenoid valve or valves 48 and thereby prevent air from being supplied to vibrators 34. In such a manner, vibratory input to shaker table assembly 20 is terminated. The signal from drive circuitry 50 also causes an atmospheric vent 51, coupled to drive manifold 52, to open, thus permitting release of pressure therefrom.

Drive manifold 52 comprises a plenum to insure a uniform flow of air equally to all vibrators. Air pressure switches 54 and switch inputs 56 are coupled in series between drive manifold 52 and micro-processor 26 and may be used for one or more purposes. They can act limit switches to cut off the flow of air to the manifold in the event that the air pressure drops below a preset pressure, to cut off air flow if the pressure is too high, and to assure that the pressure is adequately high in the drive manifold prior to commencement of the test.

Air to drive manifold 52 is supplied through a variable area orifice 58 through a conduit 89. Its purpose is to vary the drive manifold pressure level with respect to time so that a greater or lesser amount of air will be supplied to pneumatic vibrators 34 which, in turn, will then cause different levels of vibration to be exerted against driving structure 36. Variable-area orifice 58 is driven by a flow-control mechanism 60 which, in turn, is driven by variable-flow control drive circuitry 62 from microprocessor 26.

The average pressure of air over a period of time is controlled by an air-pressure regulator 66 which, in turn, is controlled by a regulator servo 68 and air-pressure regulator servo drive circuitry 70 operated from micro-processor 26. Limit switches 72 prevent overtravel of its mechanism. The purpose of air-pressure regulator 66 is to insure that the proper average flow and pressure of air be supplied to variable-area orifice 58 over a period of time.

Air is supplied to regulator 66 from an air supply 74, and the air is filtered through an air filter 76.

In further partial explanation of the operation of the system, before vibrational testing of test item 42 occurs, the pressure in drive manifold 52 is sensed through air pressure switches 54 so that air pressure regulator 66 can be set to supply that pressure and quantity of air which is required to start pneumatic vibrators 34 when the vibration test begins. After the start of the test, the average of the acceleration levels for a set period of time, e.g., 2½ minutes, is sensed by accelerometers 44 to operate air pressure regulator 66. Meanwhile, the program input from microprocessor 26 to variable area orifice 58 continues at a rapid pace, e.g., 2¾ seconds per pressure change. The variable area orifice is varied while the average acceleration levels are taken, in order to control the average pressure of air supplied to the pneumatic vibrators, so that the average acceleration response (Grms) is controlled.

Coupled with this operation, regulator and orifice limit switches 72 and 64 are actuated to prevent signals from operating the servos beyond what is desired, as well as to so forward this information to the microprocessor.

The operation of feedback and overtest protective subsystem 28 is as follows. Subsystem 28 receives signals from accelerometers 44 and provides two functions, a first being overtest protection and the second being notification of vibration test information of the microprocessor.

This latter function employs low-pass filter and sample-and-hold function 46, a multiplexer 140, and an analog-to-digital converter 142. Their purpose is to digitize the analog signal from the selected accelerometers for the purpose of determining the root-mean-square acceleration level of the test item. For a multi-axis screening facility, an average of two to six accelerometer signals from at least two and preferably three of the three orthogonal directions is required. Multiplexer 140 permits handling of signals simultaneously from more than one axis. In operation, microprocessor 26 through electrical connection 143 addresses the sample-and-hold function in component 46 to have it either sample or hold the analog accelerometer signal, as well as to address multiplexer 140 to select the channel or accelerometer signal applied to analog-to-digital converter 142. A channel selector 145 determines the number of accelerometer channels which microprocessor 26 is to address to multiplexer 140.

As shown in FIG. 1, subsystem 28 has a secondary function to provide for overtest protection, utilizing auxiliary multiplexers 144, a peak detector 146, and an overtest protective function 148. These components are of conventional design. In operation, channel selector 145 determines the number of accelerometer channels which auxiliary multiplexer 144 scans so that unfiltered signals from accelerometers 44 are properly fed to these components and therefrom to hardware protection circuitry 32. In the event that the vibrational level of shaker table assembly 20 becomes too great, as sensed by accelerometers 44, this information is processed to permit hardware protection circuitry 32 to interrupt the operating signal from microprocessor 26 to solenoid valves 48, thereby to prevent further supply of air to pneumatic vibrators 34.

Air pressure switches 54 are used to determine what the drive manifold pressure is and to preset the pressure at a desired level. At least two switches are utilized for nominal and low pressure, respectively to preset the pressure and to turn the test off at a selected low pressure to prevent vibration below a particular switch setting. If desired, a high pressure switch may be used to prevent vibration above a specified level.

The operator interface subsystem, denoted generally by indicium 30, is coupled to microprocessor 26, timing circuitry 150, and hardware protection circuitry 32 and embodies those functions which the operator actuates or is displayed. A test enable start/stop function 152 begins or ends the test. A test-time display 154 and a test-level display 156 respectively show the time and the level of RMS acceleration during test. A test-time duration setting 158 and a test-level setting 160 respectively set the duration and level of the test.

Timing circuitry 150 is coupled between microprocessor 26 and hardware protection circuitry 32 for the purpose of enabling the operator to set the duration of the test and to enable the control system to stop the vibration after the test time period has elapsed. The output from the counter is connected to display 154 to indicate the time remaining for the test. Upon reaching zero time at the end of the test period, a signal is sent to hardware protection circuitry 32 which causes the test to stop. The same signal is also forwarded to microprocessor 26.

The purpose of hardware protection circuitry 32 is to interconnect the various failure detect circuitry, the operator inputs, and microprocessor 26. Its failure-detect control is derived from the overtest protective function, the timing circuitry, and the test enable, start and stop functions. When the test is enabled and started, microprocessor 26 has full control of solenoid valves 48, subject to hardware protection circuitry 32. If the overtest protection function 148 detects an overtest condition, for example, the microprocessor loses control of the servo valve. Identical results occur when the timing circuitry times out. The status hardware protection circuitry 32 is indicated by status indicators 161.

Microprocessor 26 has several functions. It modulates the air pressure, it receives and processes vibrational signals from the accelerometers, and it performs system and self-tests. Air pressure modulation occurs by varying the orifice area openings of orifice 58. It receives and processes accelerometer signals from accelerometers 44, as first processed by low-pass filter and sample-and-hold function 46, multiplexer 140, and analog-to-digital converter 142. Based upon the receipt of the acceleration signals, the microprocessor is capable of detecting accelerometer anomalies. It also estimates the Grms level which is displayed on test-level display 156, which is compared with internally programmed upper and lower limits to stop vibration if the Grms exceeds the program limits, and which is used to adjust air pressure regulator 66. Its system and self-tests are to determine the occurrence of circuitry or mechanical failure. Such microprocessors are conventional, an 8-bit microprocessor being suitable.

In operation, the microprocessor is programmed to continuously change the orifice area in variable-area orifice 58 every 1 to 2 seconds in order to preclude shaker table assembly 20 from locking onto any particular vibration, especially a natural mode thereof. These changes, effected in variable area orifice 58, are pseudo-random and have any desired distribution, e.g., uniform. As stated above, by pseudo-random, it is meant that there is a mathematical method or algorithm for selecting a sequence of numbers. This sequence is random in the sense that it obeys certain statistical laws of randomness. By pseudo, it is meant that the randomness is not purely random because the sequence results from predetermined calculations. By uniformity, it is meant that every drive manifold pressure is equally likely to be selected. A finite number of opening positions has been selected to be 128, as an example.

Figure 3:
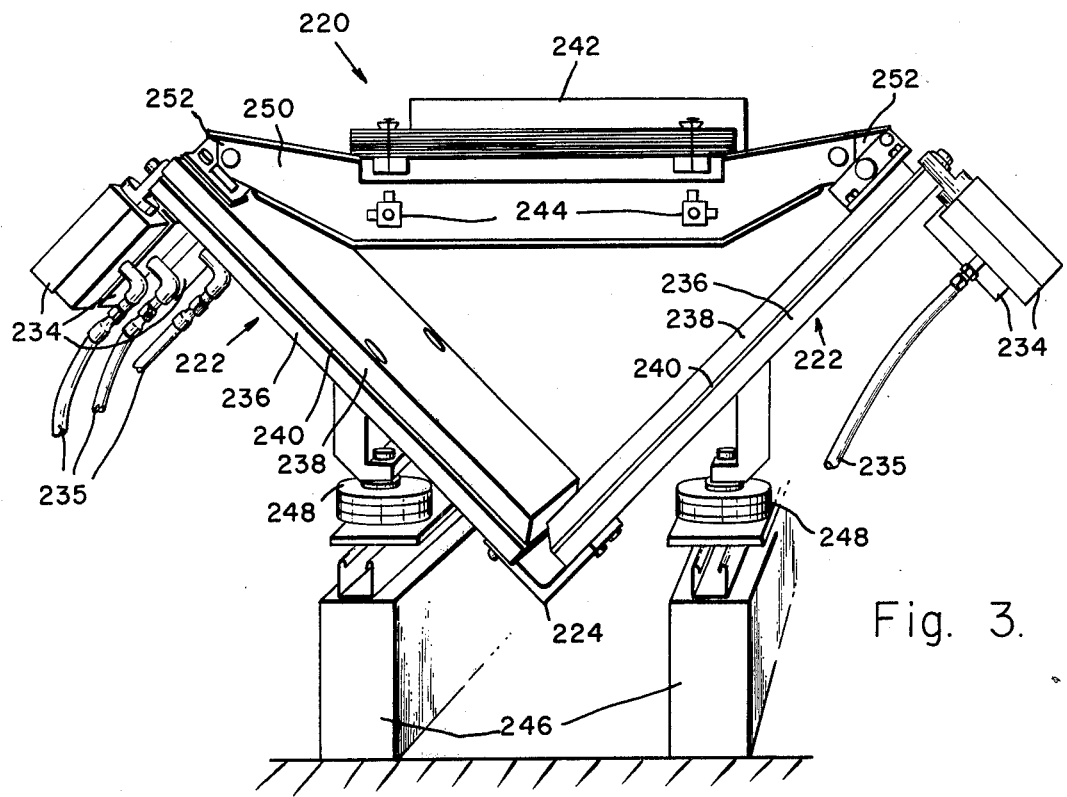
FIGS. 3–5 and FIGS. 6 and 7 respectively illustrate first and second embodiments of the shaker table assembly useful for use in the system of FIG. 1.
Figure 4:
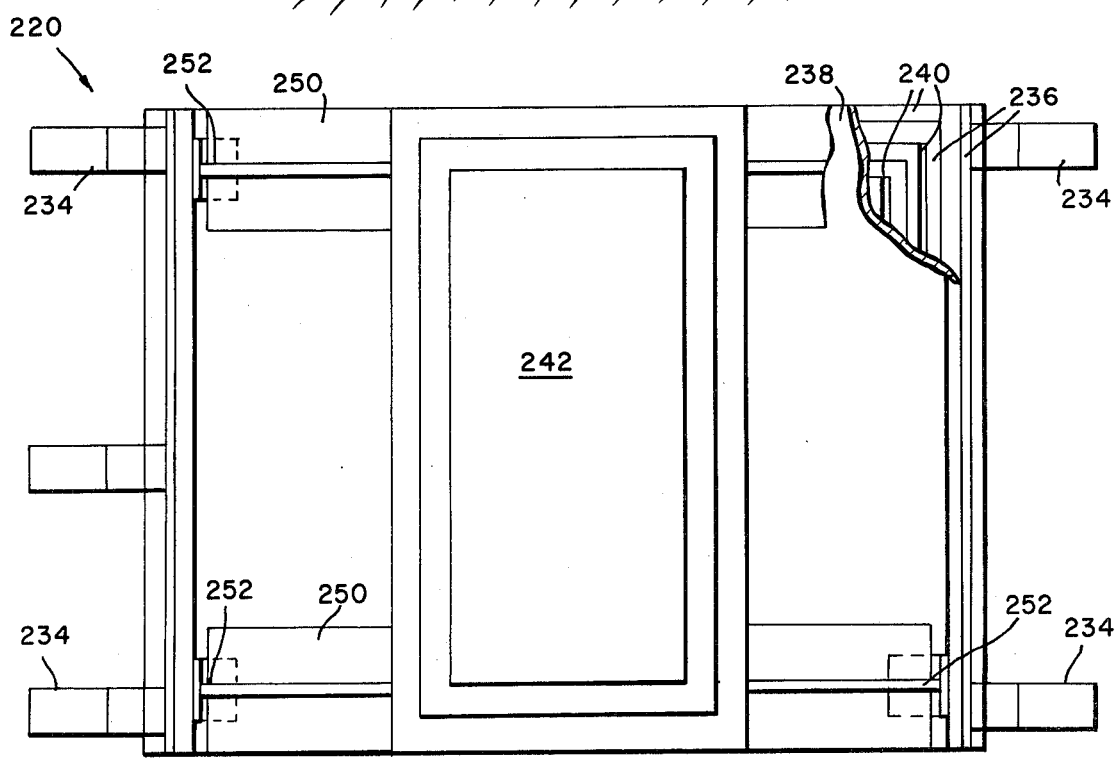
Figure 5:
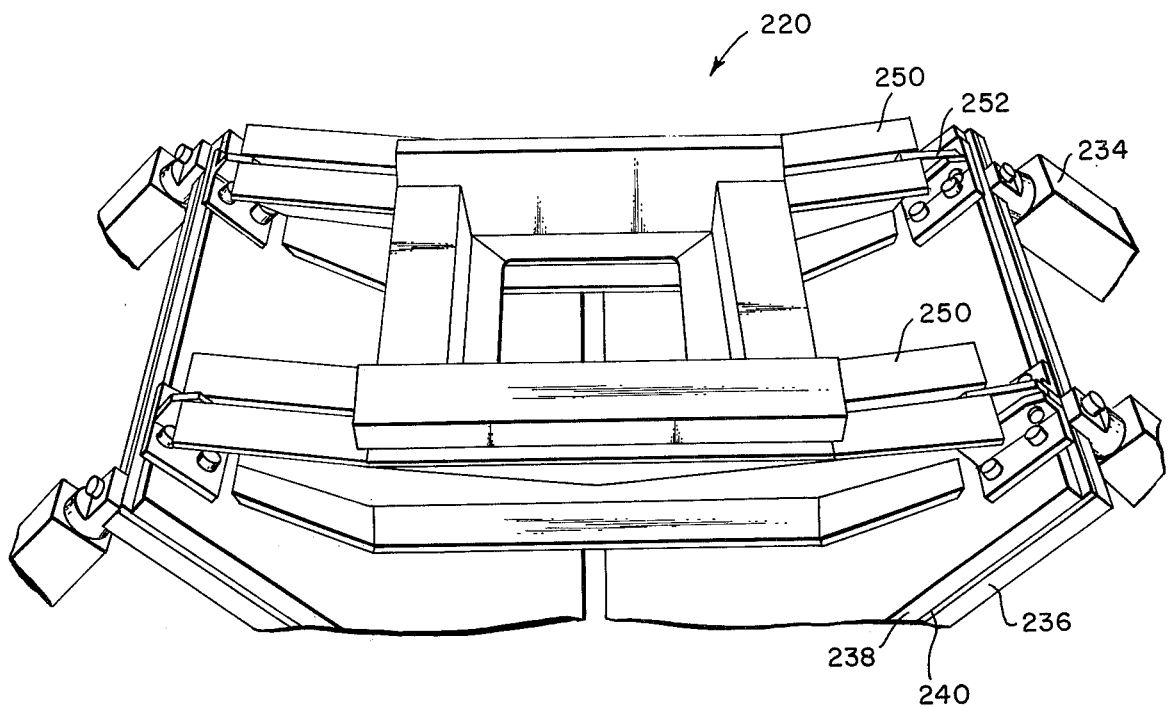

Reference is now made to FIGS. 3-5, in which a first embodiment of the invention comprises a shaker apparatus 220 for establishing and controlling a vibration spectrum characterized in three degrees of freedom by relatively uniform RMS acceleration in two orthogonal axes.

Specifically, a pair of plate structures 222 include a driving plate 236, a drive plate 238, and a shaped elastomeric coupling 240 bonded between the plates with an elastomer adhesive to insure integrity. Both structures 222 are secured to one another by angle connectors 224 to form a V-shaped configuration. Secured to driving plates 236 are a plurality of pneumatic vibrators 234 with their hose connections 235 connecting them to solenoid valves 48 (FIG. 1). Plate structures 222 are mounted on suspension bases 246 through the intermediary of resilient damping isolators 248.

Coupled to driven plates 238 is a driven space-frame 250 through the intermediary of joints 252 located at predominant antinodes. Secured directly or indirectly to space-frame 250 is test item 242 as well as accelerometers 244 for transmittal of vibrational acceleration history to feedback and overtest protective sub-system 28 and microprocessor 26.

Figure 6:
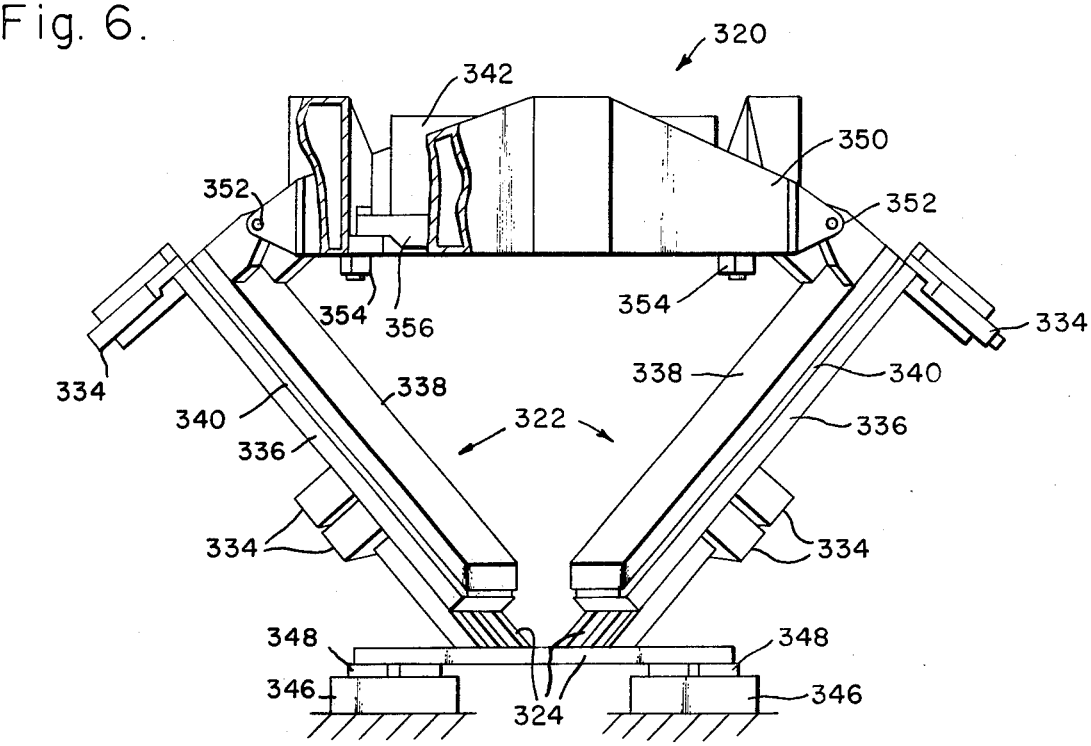
Figure 7:
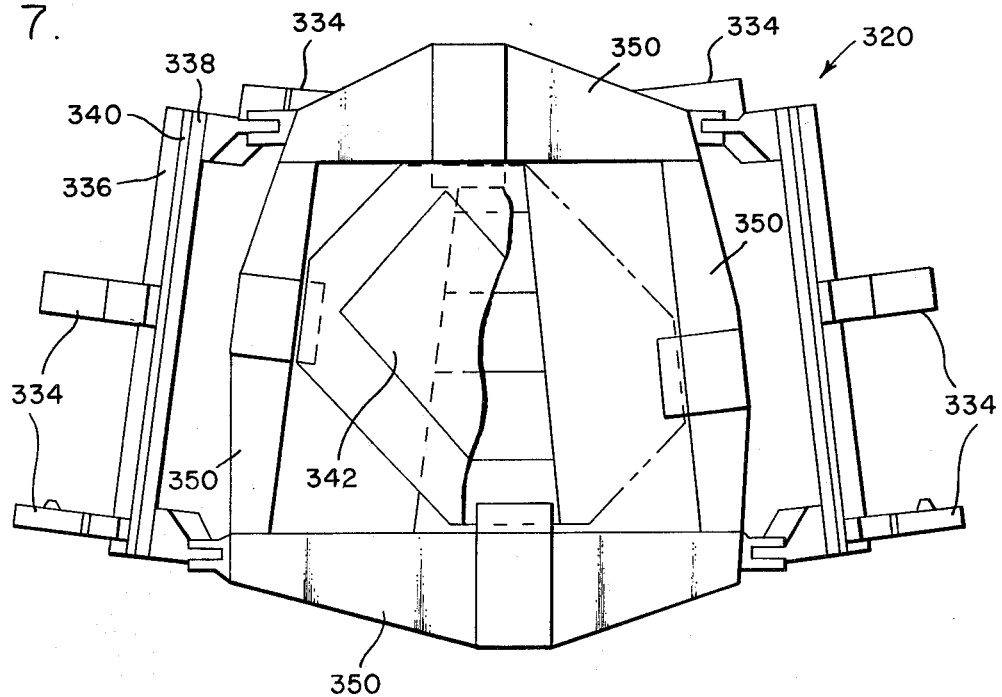

FIGS. 6 and 7 depict a second embodiment of the shaker assembly generally designated by indicium 320. While similar to the embodiment depicted in FIGS. 3-5, shaker assembly 320 is characterized by providing 6-degrees-of-freedom test article excitation. It comprises equal sized plates arranged in skewed fashion about an asymmetrical space frame, to which the test hardware is affixed.

Specifically, assembly 320 comprising a pair of plate structures 322, each of which comprises a driving plate 336, a driven plate 338, and shaped elastomeric coupling 340 bonding the two plates together. In this embodiment, plate structures 322 are secured together by a connector 324 in such a manner that they are placed in a skewed V-shaped configuration. In a manner similar to that previously depicted, plate structures 322 are mounted on bases 346 through the intermediary of isolators 348.

Attached to driving plate 336 are a plurality of pneumatic vibrators 334, and coupled to driven plates 338 is a driven space-frame 350, through the intermediary of pivotal high-strength ball-joints 352 which are located at maximum displacement antinodes. A test item or article 342 is secured to space-frame 350 by a test fixture 356. Accelerometers 354 provide the necessary vibrational history feedback information as shown in FIG. 1.

The above structures depicted in FIGS. 3-7 provide for an interrelationship of mechanical driving with feedback. In particular, the vibrators provide mechanical driving input to the driving structure which, through the elastomers, mechanically drive the driven structure and the test item itself. During this mechanical driving, there is a corresponding, albeit much attenuated, mechanical feedback between each of the adjacent structures, that is, from the test item to the driven structure, from the driven structure to the elastomers, from the elastomers to the driving structure, and from the driving structure to the vibrators. In addition, the shaped elastomeric coupling between the driving and driven plates is placed to produce forced antinodes. These forced antinodes bias the modal character of the driving structure, the elastomers, and the driven structure concurrently. The result of these inter-relationships, as depicted in FIG. 2, insures that the driving structure assumes varying modes of dynamic displacements based upon vibratory inputs acting in conjunction with the plates physical configuration and material properties. Its physical configuration is based upon its plate area determined by the test article size (weight and volume) requirements, thickness distribution selected to favor many natural vibration frequencies just outside the harmonic frequencies of the pneumatic vibrators, and the appropriate modulus of elasticity.

The present invention has been successfully tested and has demonstrated multi-mode, relatively uniform spectral density characteristics, with good uniformity of acceleration levels in the prescribed axes characteristic of the embodiment depicted in FIGS. 3-5 with two translational axes and rotation about the third axis and, for the embodiment depicted in FIGS. 6 and 7, three orthogonal displacement axes, and rotational components about each. By modulating the pneumatic vibrator output by pressure changes, a beneficial forced frequency/harmonic smearing of the power spectrum is effected.

Tests of the present invention have demonstrated good multi-modal, multi-directional input characteristics, with good uniformity of overall acceleration distribution. By modulating the pneumatic vibrator output by pressure changes, a beneficial forced frequency/harmonic smearing of the power spectrum is effected. Furthermore, altering the shape, consistency and stiffness/damping characteristic of the elastomer provides for a usable power control/modulation technique for selective frequency/amplitude modulation. In conjunction with the closed-loop, pseudo-random pneumatic pressure controls system, the present invention provides for modal density and acceleration uniformity for multi-degrees-of-freedom with desired frequency roll-off for which it was intended.

Although the invention has been described with reference to particular embodiments thereof, it should be realized that various changes and modifications may be made therein without departing from the spirit and scope of the invention.

What is claimed is:

1. A shaker for vibration testing a test item comprising a driving structure for producing vibratory excitations, a visco-elastic structure coupled to said driving structure for modifying the vibratory excitations transmitted thereto, and a driven structure coupled to said visco-elastic structure and supporting the test item for further modifying the vibratory excitations which are exerted on the test item.

2. A shaker for vibration testing of a test item comprising:
   a driving structure;
   means coupled to said driving structure for imparting vibratory excitations thereto, to cause timespace displacements of said driving structure;

a driven structure supporting the test item; and a visco-elastic structure coupling said driving and driven structures together, and including elastomeric materials for directing, filtering and attenuating the amplitude of the time-space variant displacements from said driving structure to said driven structure at the visco-elastic coupling interfaces therebetween.

3. A shaker according to claim 2 wherein said elastomeric materials have non-linear transmissive properties and are placed at selected locations between said driving and driven structures for selectively controlling the transmissibility of the vibratory excitations over a selected frequency range and for inhibiting transmission of the vibratory excitations beyond the selected frequency range.

4. A shaker according to claim 3 wherein said elastomeric materials are configured as patterns for defining the selected locations of contact between said driving and driven structures, said contact patterns and the transmissive properties of said elastomeric cooperating to effect mutually coupled vibration modes of driving-driven intercoupling between said driving and driven structures.

5. A shaker according to claim 2 or 4:

wherein said driving and driven structures respectively comprise plates and said vibratory excitation imparting means comprise a plurality of vibrators; and further comprising a pair of interconnected non-coplanar plate structures, each including a sandwiched construction of said driving plate, said driven plate and said visco-elastic structure, with at least one of said vibrators secured to each of said driving plates for causing each of said driving plates to vibrate in multiple plate bending modes and to impart substantially one dimensional displacements at each of said visco-elastic coupling interfaces, thereby causing the displacements to occur at many different rates and amplitudes at said coupling interfaces.

6. A shaker according to claim 5 wherein said non-coplanar plate structures have a V-shaped configuration defining spaced apart upper edges, and lower edges with said driving plates at said lower edges secured to a support, and further including a flexible space frame coupling said driven plates near corners at said spaced apart upper edges together for supporting the test item.

7. A shaker according to claim 6 wherein:

said V-shaped configuration of said non-coplanar plate structures has substantially constant cross-section throughout their lengths, and said flexible space frame is substantially symmetrical for creating displacements of said space frame at its couplings to said non-coplanar plate structures, for superpositioning interacting characteristics of the vibratory excitations of said flexible symmetrical space-frame, thus resulting in a planar, three-degree-of-freedom displacement-time history at the test item.

8. A shaker according to claim 6 wherein:

said non-coplanar plate structures are skewed with respect to one another for skewing said V-shaped configuration, and said flexible space frame is substantially asymmetrical for creating non-coplanar displacements of said space frame at its couplings to said non-coplanar plate structures for superpositioning interacting characteristics of the vibratory excitations of said flexibly asymmetrical space-frame, thus resulting in a six-degree-of-freedom displacement-time history at the test item.

9. A shaker according to claim 5 wherein said vibrators comprise pneumatic vibrators, and further including means including an air supply for driving said pneumatic vibrators.

10. In a vibration system having means for supporting a test item, vibrators coupled to said supporting means for generating quasi-random, simultaneous multi-axis vibration in the test item, means coupled to said vibrators for automatically causing said vibrators to vary their vibratory output and thereby for enhancing the randomness in the multi-axis vibration, and means defining a closed loop with said vibrators for sensing and controlling the level of the multi-axis vibration, an improved supporting means comprising a driving structure to which said vibrators are attached, a driven structure supporting the test item, and a visco-elastic structure coupling said driving and driven structures.

11. A method for quasi-randomly varying vibration frequencies applied to a test item comprising the steps of utilizing the combination of bending structure and visco-elasticity for superimposing a number of simultaneously produced vibrations, and applying the vibrations to the test item.

12. A method according to claim 11 wherein said superimposing step includes the step of flexing a pair of plates joined visco-elastically by the input of means for producing the vibration frequencies in a manner which is faster with respect to averages of acceleration levels derived from the vibrating test item.

13. A method according to claim 11 or 12 further including the step of utilizing air for driving pneumatic vibrators by which the vibration frequencies are produced.

* * * * *